United States Patent [19]
Nishino

[11] Patent Number: 6,055,534
[45] Date of Patent: *Apr. 25, 2000

[54] FILE MANAGEMENT SYSTEM AND FILE MANAGEMENT METHOD

[75] Inventor: Yaichi Nishino, Kanagawa, Japan

[73] Assignee: Fuji Xerox Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/684,189

[22] Filed: Jul. 19, 1996

[30] Foreign Application Priority Data

Jul. 20, 1995 [JP] Japan .................................. 7-183657

[51] Int. Cl.[7] .................................................. G06F 17/30
[52] U.S. Cl. ........................... 707/10; 707/200; 707/203; 707/205
[58] Field of Search .............................. 395/185.1; 380/4; 707/205, 200, 204, 101, 10, 203, 9

[56] References Cited

U.S. PATENT DOCUMENTS

| | | | |
|---|---|---|---|
| 4,658,351 | 4/1987 | Teng | 709/103 |
| 5,239,647 | 8/1993 | Anglin et al. | 707/205 |
| 5,475,838 | 12/1995 | Fehskens et al. | 395/185.1 |
| 5,495,603 | 2/1996 | Fruchman et al. | 707/200 |
| 5,515,532 | 5/1996 | Iijima | 707/200 |
| 5,537,636 | 7/1996 | Uchida et al. | 707/200 |
| 5,544,356 | 8/1996 | Robinson et al. | 707/205 |
| 5,586,322 | 12/1996 | Beck et al. | 707/200 |
| 5,603,020 | 2/1997 | Hashimoto et al. | 707/200 |
| 5,623,651 | 4/1997 | Jernigan, IV | 707/200 |
| 5,689,560 | 11/1997 | Cooper et al. | 380/4 |
| 5,745,748 | 4/1998 | Ahmad et al. | 707/10 |
| 5,764,972 | 6/1998 | Crouse et al. | 707/1 |
| 5,778,365 | 7/1998 | Nishiyama | 707/9 |
| 5,819,275 | 10/1998 | Badger et al. | 707/100 |
| 5,873,085 | 2/1999 | Enoki et al. | 707/10 |

OTHER PUBLICATIONS

ISO/IEC 10166–1:1991(E), Standard of DFR (Document Filing and Retrieval), First Edition, Dec. 15, 1991), pp. 19–20, 57–62.

*Primary Examiner*—Wayne Amsbury
*Assistant Examiner*—Charles L. Rones
*Attorney, Agent, or Firm*—Finnegan, Henderson, Farabow, Garrett & Dunner, L.L.P.

[57] ABSTRACT

An attribute update section includes attribute update list information in which update requests are preset and an attribute rewrite section for rewriting file attribute information. The attribute rewrite section rewrites the attribute information at a predetermined time according to the attribute update list information, thereby preventing the user from forgetting the change, and reducing the user load. The attribute rewrite section rewrites the attribute information when the attribute information is accessed, or at every constant time intervals or at a predetermined time, whereby the processing load of the system can be reduced and the processing efficiency can be improved.

2 Claims, 9 Drawing Sheets

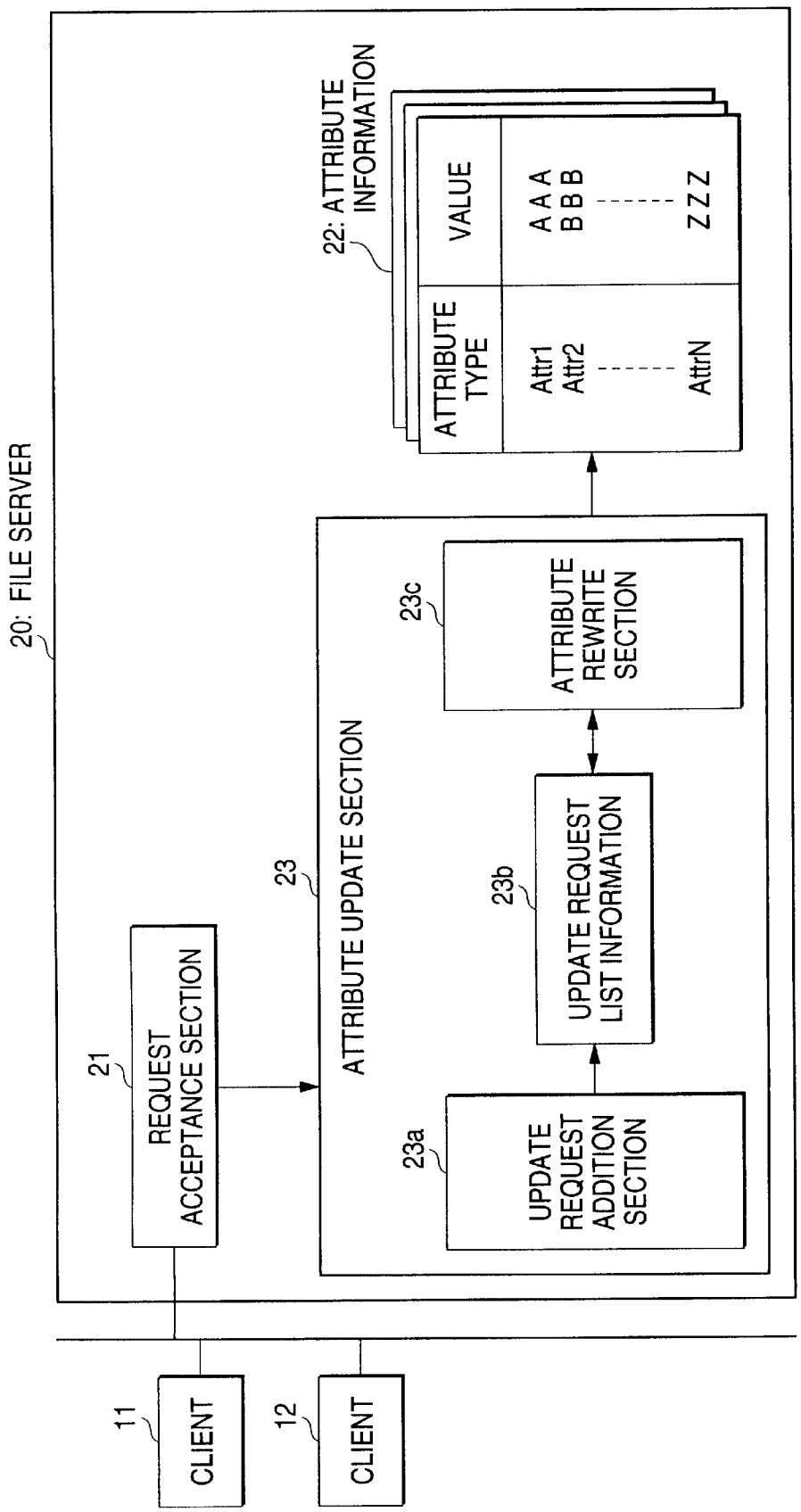

FIG. 2

| FILE IDENTIFIER | ATTRIBUTE TYPE | UPDATE TIME | | UPDATED VALUE |
|---|---|---|---|---|
| FileA | TITLE | 95-7-12 | 12:00 | "OPEN TO PUBLIC" |
| FileB | ACCESS RIGHT | 95-7-12 | 12:30 | "every one" |
| FileC | ASSIGNED FOLDER | 95-7-13 | 12:30 | FolderX |
| FileD | CONFIDENTIALITY | 95-7-14 | 12:00 | OPEN |
| --- | --- | --- | | --- |
| FileM | TITLE | 95-7-16 | 8:00 | "OPEN TO COMPANY" |
| FileM | CONFIDENTIALITY | 95-7-16 | 8:00 | "OPEN" |
| FileM | ACCESS RIGHT | 95-7-16 | 8:00 | "A COMPANY" |
| FileN | ASSIGNED FOLDER | 95-7-17 | 17:00 | "JUNE" |
| FileO | TITLE | 95-7-18 | 8:00 | "OPEN TO PUBLIC" |
| FileO | ACCESS RIGHT | 95-7-18 | 8:00 | "every one" |
| FileO | ASSIGNED FOLDER | 95-7-18 | 8:00 | "FOR OPENING TO PUBLIC" |
| FileO | ASSIGNED FOLDER | 95-8-18 | 17:00 | "GARBAGE CAN" |

23b

FILE MANAGEMENT SYSTEM AND FILE MANAGEMENT METHOD

BACKGROUND OF THE INVENTION

This invention relates to a file management method and system for managing files, and in particular to a file management system for managing file attributes in a file server, etc., for managing files shared on a network.

In recent years, a client and server system wherein a plurality of clients and a plurality of servers that can be provided by workstations or personal computers are connected to each other by a local area network (LAN) has come into wide spread use. In the system, it is a file server that particularly manages files shared on the network.

The file server adopts a general file system such as a UNIX ( a trademark of Novell, Inc.) file system or DFR (document filing and retrieval). In such a file system, generally it is considered that a file is made up of a content section indicating actual data and an attribute section of additional information such as a title given thereto. Further, the attributes in the attribute section of the file can be roughly classified into those managed by the server and those managed by the user.

The attributes managed by the server are "creation time of day," "creator name," etc., for example,; even if the user does not explicitly specify them, the file system automatically sets their values. For example, when a file is created, automatically the UNIX file system sets information such as "creator," "creation time of day," "creator group," and "file identifier" without explicit specification of the user. Other file systems also set similar attributes automatically.

On the other hand, the attributes managed by the user are "title," "retrieval keyword," etc., for example. "Extended attribute," etc., in DFR is also an example of the attributes managed by the user. The file system does not interpret the contents of the attributes managed by the user and the attribute values can be set only by the user who explicitly specifies them.

Thus, in the conventional file systems, basically the values of the attributes managed by the server are set and updated by the file system and the values of the attributes managed by the user can be set and updated only by the user who explicitly specifies them.

A system for managing file attributes is described in Japanese Patent Unexamined Publication No. Hei 1-263746, wherein an automatic registered person list management system is disclosed. This automatic registered person list management system comprises a file server for managing files and a certification server for managing a list for enabling access to directories in the file server. When the list in the certification server is changed, an access list in the file server is also changed. Thus, when the registered person list in the certification server is changed, if the registered person changed is used for the directories in the file server, labor for applying the same change of the registered person to all directories including the access list can be saved. Also in this case, the attributes managed by the user are not changed by the server in the file system independently, and are changed only by specification from others, in this case, the certification server.

As described above, the file system of the file server does not take the liberty of changing the attributes managed by the user except that the user gives explicit instruction. Thus, for example, if it is previously known that an attribute value must be changed after a lapse of a given time, the user must change the value explicitly after a lapse of the given time; the load put on the user is large and the mistake of forgetting the change is prone to occur.

SUMMARY OF THE INVENTION

It is therefore an object of the invention to provide a file management system wherein a server can update user-managed attributes at a predetermined time if it is previously known that the user will change the attribute values of the user-managed attributes after a lapse of a given time for reducing the load put on the user who must explicitly change attributes and decreasing the occurrence probability of artificial mistakes of forgetting the change, etc.

It is another object of the invention to provide a file management system that can improve processing efficiency by considering the attribute value change time for preventing labor required for attribute change from occurring more than necessary.

According to a first aspect of the invention, there is provided a file management system for managing attribute information of files stored in a file storage, comprising means for storing attribute update condition information in which update time conditions and update content information are set corresponding to attributes of the files, and attribute rewrite means for rewriting based on the update content information, a value of an attribute in attribute information of the file corresponding to attribute in the attribute update condition information when the update time condition is satisfied.

According to a second aspect of the invention, there is provided a file management system for managing attribute information of files stored in a file storage, comprising means for storing attribute update condition information in which update time conditions and update content information are set corresponding to attributes of the files, means for determining whether or not update is required based on the update time condition set in the attribute update condition information when access to attribute information of the file is detected, and attribute rewrite means for rewriting based on the update content information, a value of the corresponding attribute in the attribute information of the file, update of which is determined to be required by the means for determining whether or not update is required.

Preferably, the file management systems of the first and second aspects of the invention further include means for setting the attribute update condition information in the storage means based on input attribute update condition information.

According to the first aspect of the invention, the update time conditions (for example, update time), update content information (for example, updated values), and the like for attributes, if it is previously known for the user to change the attribute values of the attributes at predetermined time, are set in the attribute update condition information in the storage means, and when the update time condition is satisfied (for example, the update time is reached), the attribute rewrite means updates the attribute value in the attribute information of the file corresponding to the attribute based on the update content information. If the update content information is, for example, an updated value, the attribute value is updated to the updated value. Thus, the user-managed attributes can be updated at the setup time and the user load concerning the attribute update can be reduced.

In the second aspect of the invention, attribute update conditions are preset in the attribute update condition information, for example, as in the first aspect of the invention and when access to file attribute information is detected, the means for determining whether or not update is required references the attribute update condition information to determine whether or not update is required based on the setup update time condition. For example, the means determines whether or not update is required depending on whether or not the current time is past the update time as the update time condition. If there is an attribute whose update time is before the current time, the means requests the attribute rewrite means to update the value of the corresponding attribute in the file attribute information to the updated value. Thus, when the file attribute information is accessed, attribute rewrite is executed, whereby processing efficiency can be improved.

BRIEF DESCRIPTION OF THE DRAWINGS

FIG. 1 is a block diagram to show a configuration example of a file management system of the invention;

FIG. 2 is an illustration to show a format example of update request list information;

DETAILED DESCRIPTION OF THE INVENTION

Figure 3:
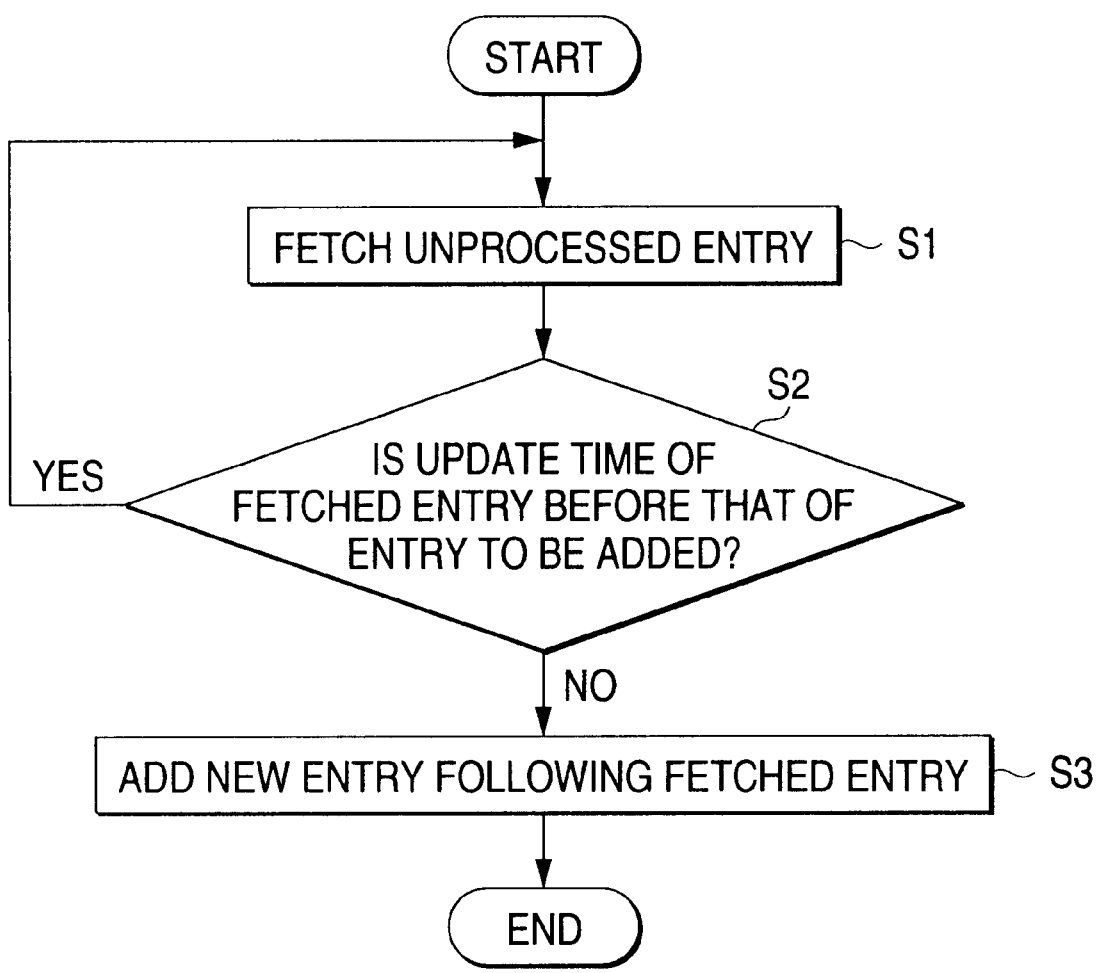
FIG. 3 is a flowchart to show a process flow of an update request addition section.

Referring now to the accompanying drawings, there are shown preferred embodiments of the invention.

FIG. 1 is a block diagram to show the configuration of a first embodiment of a file management system of the invention.

In the figure, a configuration example of a network such as a LAN is shown, wherein numerals 11 and 12 denote clients for the user to request a server to perform processing and numeral 20 denotes a file server for performing actual processing for files. In the figure, only one file server 20 is shown, but more than one file server 20 may exist.

The file server 20 consists of a request acceptance section 21 for accepting requests from the clients 11 and 12, attribute information 22 in which the attributes types and values of attributes of files managed by the file server 20 are set for each file, and an attribute update section 23 for updating the attribute values for the attribute information 22. The embodiment has an attribute read section (not shown) for reading the attribute information 22 in response to a request from the request acceptance section 21. A content management section (not shown) for managing content information of the files based on requests from the request acceptance section 21 is further included as the file server 20.

The attribute update section 23 has an update request addition section 23a for setting attribute update requests in response to requests from the clients 11 and 12 through the request acceptance section 21, update request list information 23b in which attribute update requests are set by the update request addition section 23a, and an attribute rewrite section 23c for updating the attribute values in the attribute information 22 of files in accordance with the contents of the update request list information 23b. Assume that the update request list information 23b is stored in storage means such as a memory or disk.

Attribute update request information is stored in the update request list information 23b; the request acceptance section 21 accepts an attribute update request from the client 11 or 12 and requests the update request addition section 23a of the attribute update section 23 to perform addition processing, whereby the update request addition section 23a adds the attribute update request information to the update request list information 23b for storage.

The attribute update request information in the update request list information 23b contains items of "file identifier," "attribute type," "update time," and "updated value." When the current time of day reaches the "update time" set in the update request list information 23b, the attribute rewrite section 23c changes the value of the corresponding attribute type to the value of "updated value" in the attribute information 22 of the file corresponding to "file attribute." The current time of day is gotten from a clock contained in the file server 20.

FIG. 2 is an illustration to show a format example of the update request list information.

According to the example shown in the figure, the update request list information 23b is in table format and consists of the items of file identifier, attribute type, update time, and updated value. The entries (rows) of the update request list information 23b are listed in the earlier to later update time order. When the update request addition section 23a adds an attribute update request, the already set update time and new update time to be set are considered to determine the entry addition or insertion position so that the entries are listed in the update time order. In the example, first the attribute "title" of the file having the file identifier "FileA" is changed to the attribute "open to public" at 12 o'clock on Jul. 12, 1995, next the attribute "access right" of the file having the file identifier "FileB" is given to everyone at 12:30 on Jul. 12, 1995, and the file having the file identifier "FileC" has the hierarchical structure attribute changed from the former folder to "FolderX" at 12:30 on Jul. 13, 1995 and is moved to the folder.

The update request addition section 23a sets entries in the update request list information 23b, whereby "opening of confidential document," "replacement of document folder contents," "opening of document file for limited time," etc., can be performed, for example.

The "opening of confidential document" means that the document may be opened after a lapse of one month, for example. In this case, the user changes the title of the document and changes the confidentiality attribute to open in one month, whereby the access right to the file is changed from persons only in the department to persons in the company and access from persons outside the department can be controlled. That is, like the file having the file identifier "FileM" in FIG. 2, the file attribute "title" is changed to open to company, the attribute "confidentiality" to open, and the attribute "access right" to A company at 8 o'clock on Jul. 16, 1995, whereby the confidential document can be opened automatically.

In the file system, several document files can be gathered together in a folder for storage; some document files may be moved from the latest version folder to an appropriate month folder such as the preceding month folder each time the month is changed. This is the "replacement of document folder contents." In such a case, the user can change the attribute concerning the hierarchical structure of the file at the beginning of the month, thereby replacing the document folder contents. That is, like the file having the file identifier "FileN" in FIG. 2, the file attribute "assigned folder" is changed to the June folder at 17 o'clock on Jul. 17, 1995 and automatic replacement of the document holder contents is enabled.

The "opening of document file for limited time" means that a document file is opened to the public only for a given time and is discarded after a lapse of the time. In such a case, the user changes the attribute concerning the hierarchical structure of the file on the beginning day of the time like the replacement of the document folder contents for storing the document file in a holder for opening to the public. After the expiration of the time, the user again changes the attribute concerning the hierarchical structure of the file, thereby moving the document file to a garbage can folder. That is, like the file having the file identifier "FileO" in FIG. 2, the file attribute "title" is changed to open to public, the attribute "access right" is given to public, and the attribute "assigned folder" is changed to a folder for opening to public at 8 o'clock on Jul. 18, 1995, and the file attribute "assigned folder" is changed to a garbage can folder at 17 o'clock on Aug. 18, 1995, whereby the document file is moved to the folder and can be opened to the public for the limited time.

FIG. 3 is a flowchart to show a process flow of the update request addition section.

Upon reception of a request for adding an entry to the update request list information 23b from the request acceptance section 21, the update request addition section 23a first fetches the information of the first one of unprocessed entries contained in the update request list information 23b at step S1. Since all entries are unprocessed at the beginning, the information of the first entry is fetched. The update request addition section 23a determines whether or not the update time of the fetched entry is before that of the entry to be added at step S2. If the update time of the fetched entry is before that of the entry to be added, the update request addition section 23a returns to step S1 and fetches the information of the next unprocessed entry. If the update time of the fetched entry is not before that of the entry to be added, the update request addition section 23a adds the new entry following the fetched entry at step S3. Since an entry whose update time is after that of the entry to be added is found in order and the new entry is added following that entry in the update request addition process, the update requests are listed in the earlier to later update time order.

Figure 4:
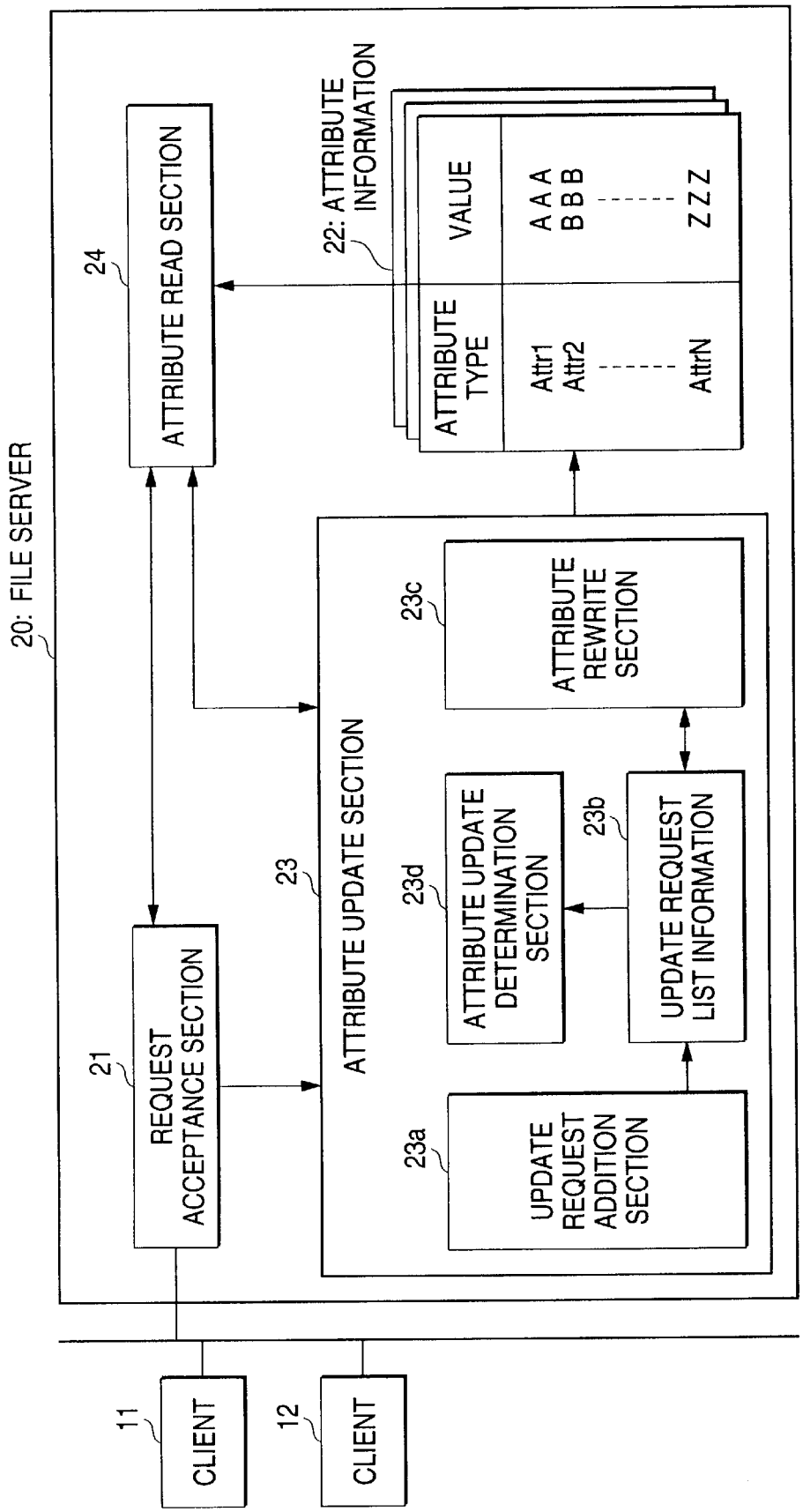
FIG. 4 is a block diagram to show another configuration example of the file management system of the invention.

Processing of the attribute rewrite section 23c will be discussed based on the update request list information 23b thus prepared by executing the update request addition process. In the configuration example in FIG. 1, the attribute rewrite section 23c is started when the time set as the update time in the update request list information 23b reaches the current time of day. To start the attribute rewrite section 23c at the time, normally the time at which the next processing needs to be performed is previously found from the update request list information 23b and is compared with the current time. When they match, the attribute rewrite section 23c starts processing. However, in the method, whether or not processing needs to be started needs always to be checked. Then, a configuration example considering the start timing of the attribute rewrite section 23c is shown below:

FIG. 4 is a block diagram to show the configuration of a second embodiment of the invention.

Components identical with those previously described with reference to FIG. 1 are denoted by the same reference numerals in FIG. 4 and will not be discussed again. According to the configuration example shown in FIG. 4, the second embodiment has an attribute read section 24 for reading file information from attribute information 22 in response to a request from a request acceptance section 21, and an attribute update section 23 has an attribute update determination section 23d for starting an attribute rewrite section 23c when the attribute information 22 is accessed.

When the attribute read section 24 reads file information from the attribute information 22 in response to a request from the request acceptance section 21, namely, when the attribute information 22 is accessed, the attribute read section 24 requests the attribute update determination section 23d of the attribute update section 23 to determine whether or not attribute update is required. The attribute update determination section 23d references the item of the update time in update request list information 23b to determine whether or not there is a request after the update time, and sends the determination result to the attribute read section 24. If the determination result indicates that update is not required, the attribute read section 24 reads the attribute information 24; if the determination result indicates that update is required, the attribute read section 24 requests the attribute rewrite section 23c of the attribute update section 23 to update the attribute for the received update request, and reads the updated attribute information 22. A detailed operation example of the embodiment will be described later.

Figure 5:
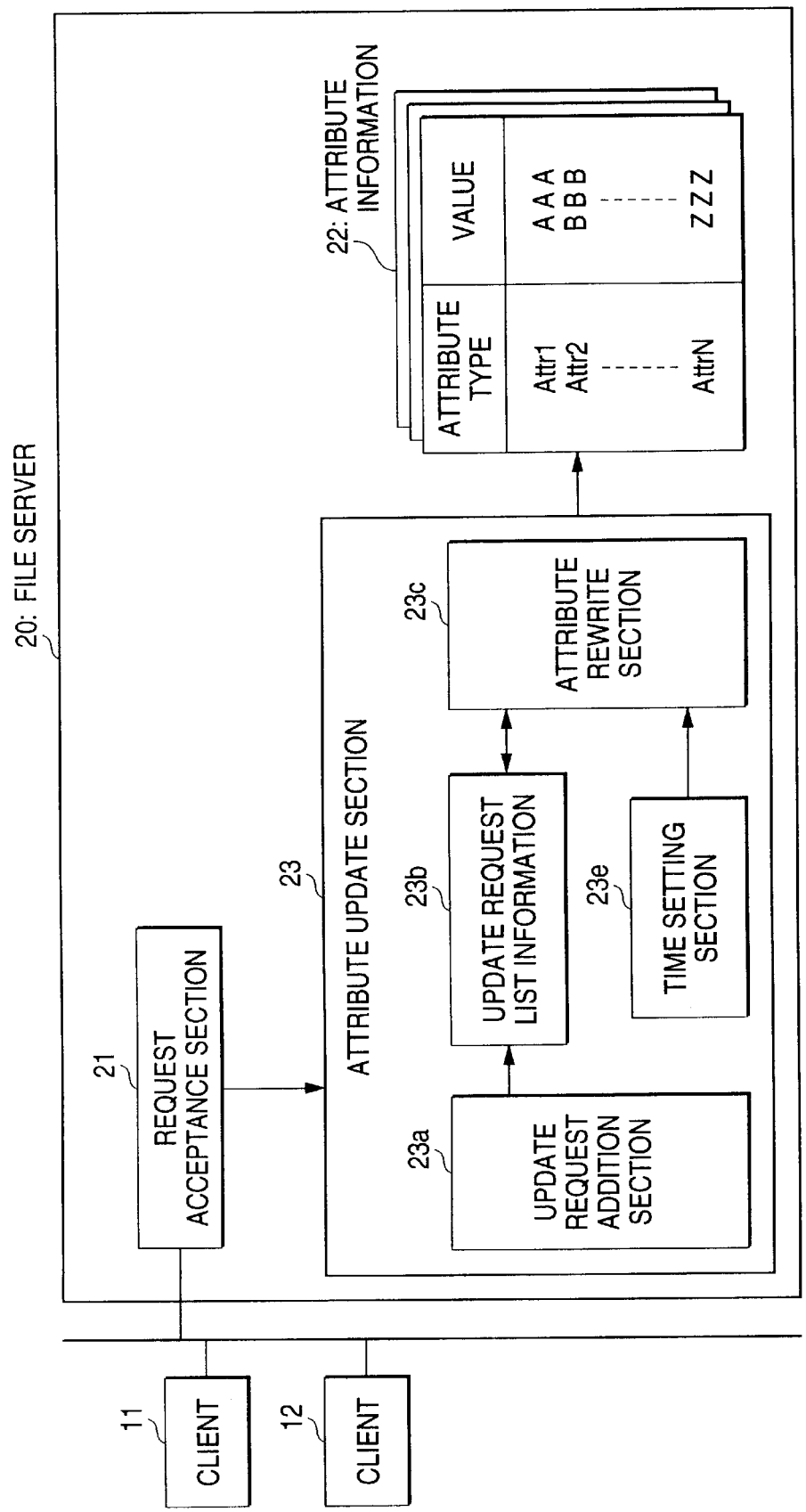
FIG. 5 is a block diagram to show another configuration example of the file management system of the invention.

FIG. 5 is a block diagram to show the configuration of a third embodiment of the invention.

Components identical with those previously described with reference to FIG. 1 are denoted by the same reference numerals in FIG. 5 and will not be discussed again. According to the configuration example shown in FIG. 5, an attribute update section 23 has a time setting section 23e for starting an attribute rewrite section 23c at the time set by the time setting section 23e.

The time setting section 23e is provided to set a time interval at which attributes are rewritten; it requests the attribute rewrite section 23c to rewrite attributes on a setup constant period basis. Therefore, the attribute rewrite section 23c is started on a constant period basis set by the time setting section 23e, namely, at predetermined time intervals. At this time, if the attributes to be updated exist, the attribute rewrite section 23c rewrites the attributes. As the time interval is made smaller, the attribute update becomes closer to real-time update, producing a similar effect to that of the first embodiment.

The time setting section 23e can also be used to specify a specific time of day rather than to set periodical time intervals for instructing the attribute rewrite section 23c to rewrite attributes at the specified time. For example, a time in the middle of the night at which the file server 20 is put under light processing load can also be preset for updating the attributes to be updated at a time when the time is reached.

Figure 6:
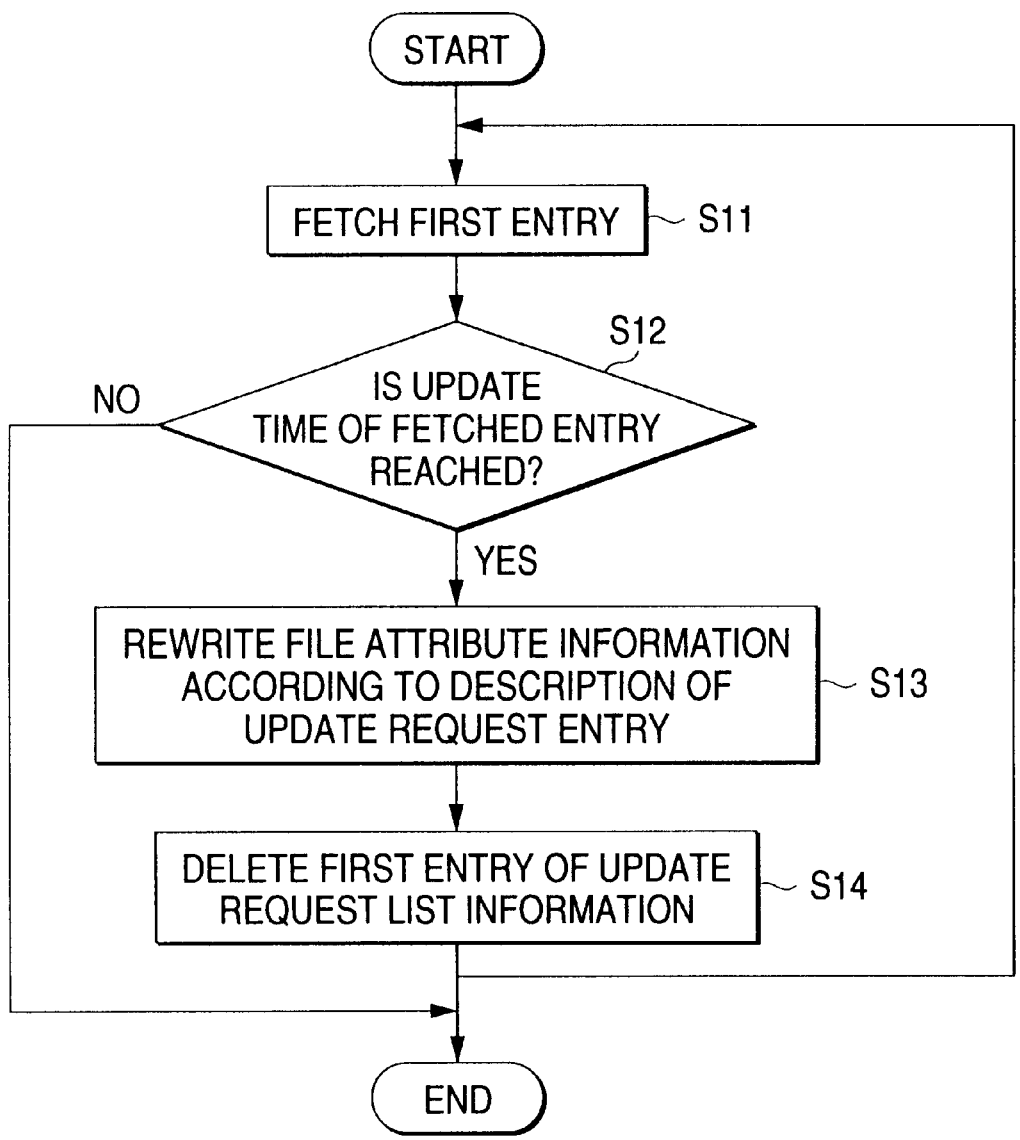
FIG. 6 is a flowchart to show a process flow of an attribute rewrite section.

Next, the operation of the attribute rewrite section 23c of the third embodiment will be discussed with reference to a flowchart of FIG. 6.

When the attribute rewrite section 23c is notified that attribute information 22 has been accessed from an attribute read section 24, or receives time information on a constant time basis or at a predetermined time from the time setting section 23e, it references update request list information 23b and fetches information of the first one of the entries contained in the update request list information 23b at step S11. The attribute rewrite section 23c determines whether or not the fetched entry reaches the update time; for example, it compares the update time of the entry with the current time to determine whether or not the current time is past the update time at step S12. Since the update request list information 23b is sorted in the update time order, if the current time is not past the update time in the information of the first entry, none of the entries reach their update time, and the processing is terminated. If the current time is past the update time of the information of the first entry, the attribute rewrite section 23c rewrites the attribute value of the corresponding attribute type in the file attribute information 22 according to the description of the update request entry at step S13, and deletes the first entry of the update request list information 23b with the attribute value already rewritten at step S14. Then, it returns to step S11 and fetches the information of the next entry to the deleted entry. Thus, the attribute rewrite section 23c compares the update time described in the first entry of the update request list information 23b with the current time in response to the received update time information. If the update time is after the current time, the attribute rewrite section 23c terminates the update processing without checking the subsequent entries; if the update time is before the current time, the attribute rewrite section 23c performs update processing for the entries until an entry whose update time is after the current time appears.

In the embodiment, update processing is performed under the same update condition (namely, constant intervals) for all files or attribute types. However, for example, the files or attribute types may be classified into those requiring immediacy and those not requiring immediacy for management according to file or attribute type nature, etc., (for example, update request list information is classified) and then update processing may be performed for them under conditions matching a request. Further, the third embodiment may be combined with the second embodiment to perform update processing for them when access is detected if it is sufficient to update them when access is detected.

Next shown is an embodiment to enable appropriate update entry access at high speed by using a hash method to determine a storage entry using internal code of a retrieval key for registering information, a method of storing and retrieving information using a table as a format example of update request list information. The hash method, which is adopted for improving processing efficiency, is not related to the essence of the invention and therefore will not be described in detail here. It is described in detail, for example, in "File System" (Keigaku Shuppan, T. R. Harbron, translated by TOYAMA Motomichi), etc.

Figure 7:
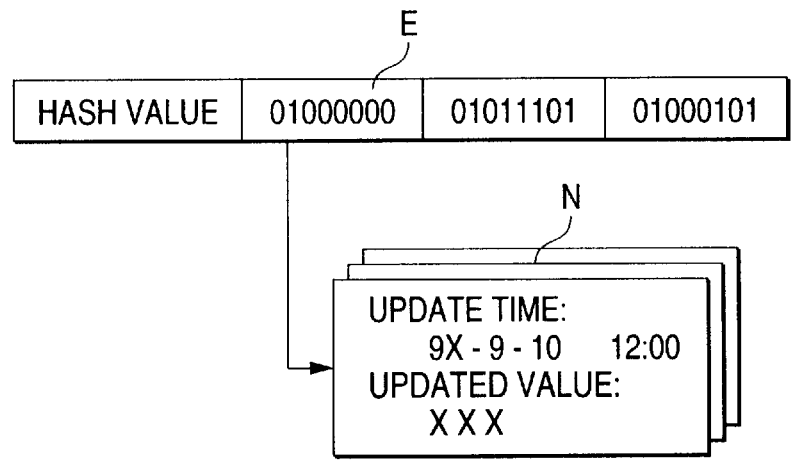
FIG. 7 is an illustration to show another format example of update request list information.

FIG. 7 is an illustration to show another format example of update request list information.

According to the update request list information shown in FIG. 7, a hash value is found according to a predetermined calculation expression from a file identifier and an attribute type of items of the update request list information, entry E corresponding to the hash value is prepared from the hash value, and update request node N prepared for each update request is arranged in the entry E in the update time order. The update time and updated value are set in the update request node N.

Figure 8:
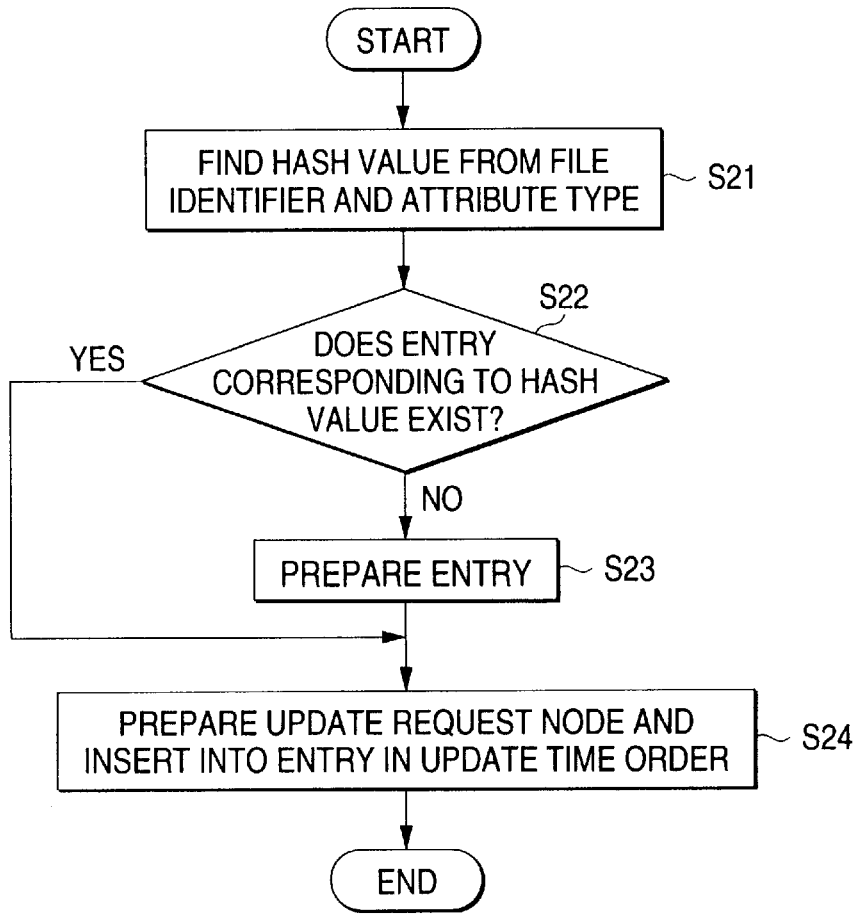
FIG. 8 is a flowchart to show another process flow of the update request addition section.

The operation of the update request addition section of each embodiment with the update request list information will be discussed with reference to a flowchart of FIG. 8.

Upon reception of an entry addition request to update request list information 23b from request acceptance section 21, the update request addition section 23a first finds a hash value from the file identifier and attribute type of the target file at step S21. Next, it determines whether or not an entry corresponding to the hash value exists at step S22. If there is no entry corresponding to the hash value, the update request addition section 23a prepares a new entry at step S23; if there is a corresponding entry, it uses the entry as an entry to which an update request is to be added. Then, the update request addition section 23a prepares an update request node and inserts it into the entry so that the prepared update request node is arranged in the update time order at step S24.

Figure 9:
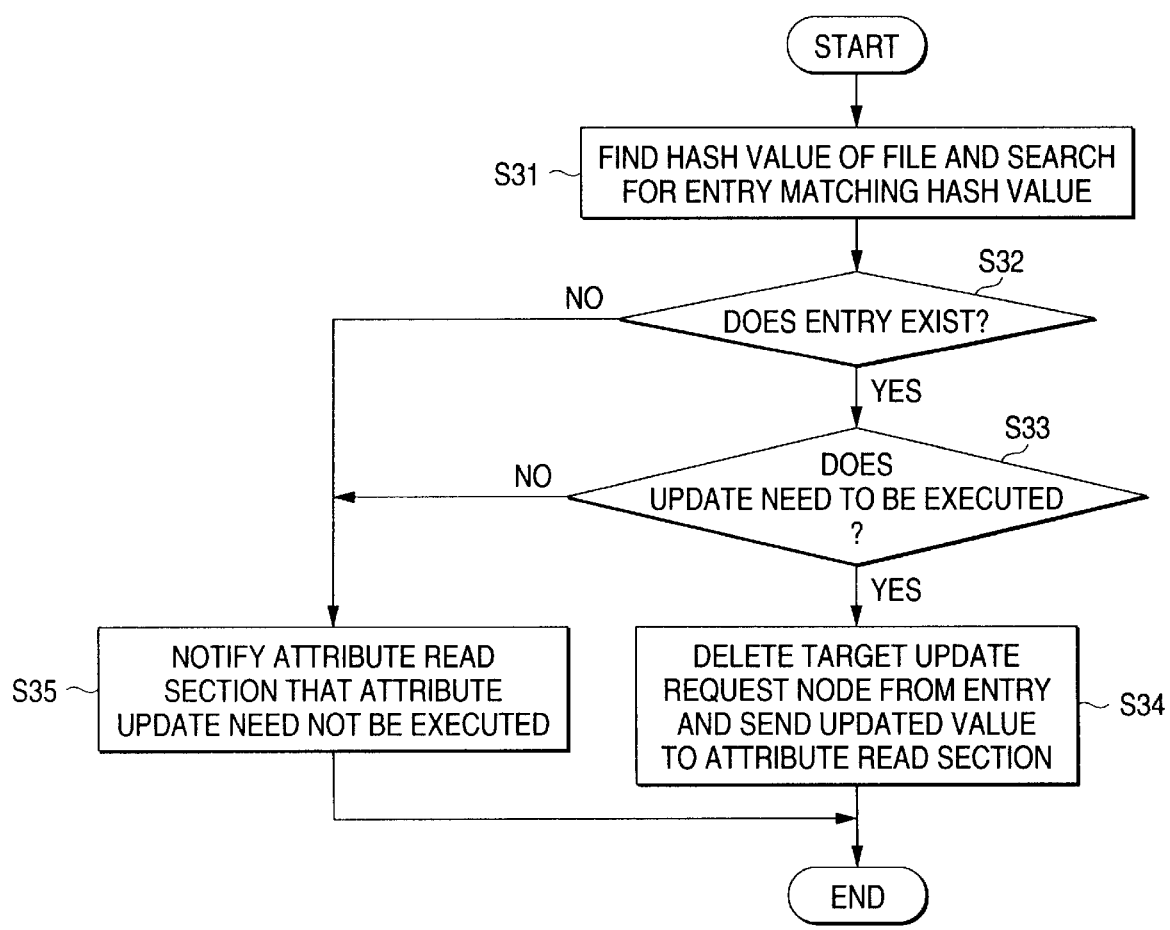
FIG. 9 is a flowchart to show the processing contents of an attribute update determination section for checking whether or not attribute value change is required.

Next, the operation of the attribute update determination section of the second embodiment will be discussed with reference to a flowchart of FIG. 9.

When the attribute read section 24 requests the attribute update determination section 23d to determine whether or not the attribute of a given file is to be changed, the attribute update determination section 23d finds the hash value of the file and searches the update request list information for an entry matching the hash value at step S31. It determines whether or not the update request list information contains the entry corresponding to the hash value at step S32. If the entry is contained, the attribute update determination section 23d references the update time of the update request node of the entry to determine whether or not update needs to be executed at step S33. If the attribute update determination section 23d determines that update needs to be executed, it deletes the update request node requiring update from the entry and sends the attribute type and updated value to the attribute read section 24 at step S34.

On the other hand, if there is no entry corresponding to the hash value or if attribute update need not be executed although there is an entry corresponding to the hash value, the attribute update determination section 23d notifies the attribute read section 24 that attribute update need not be executed at step S35.

Figure 10:
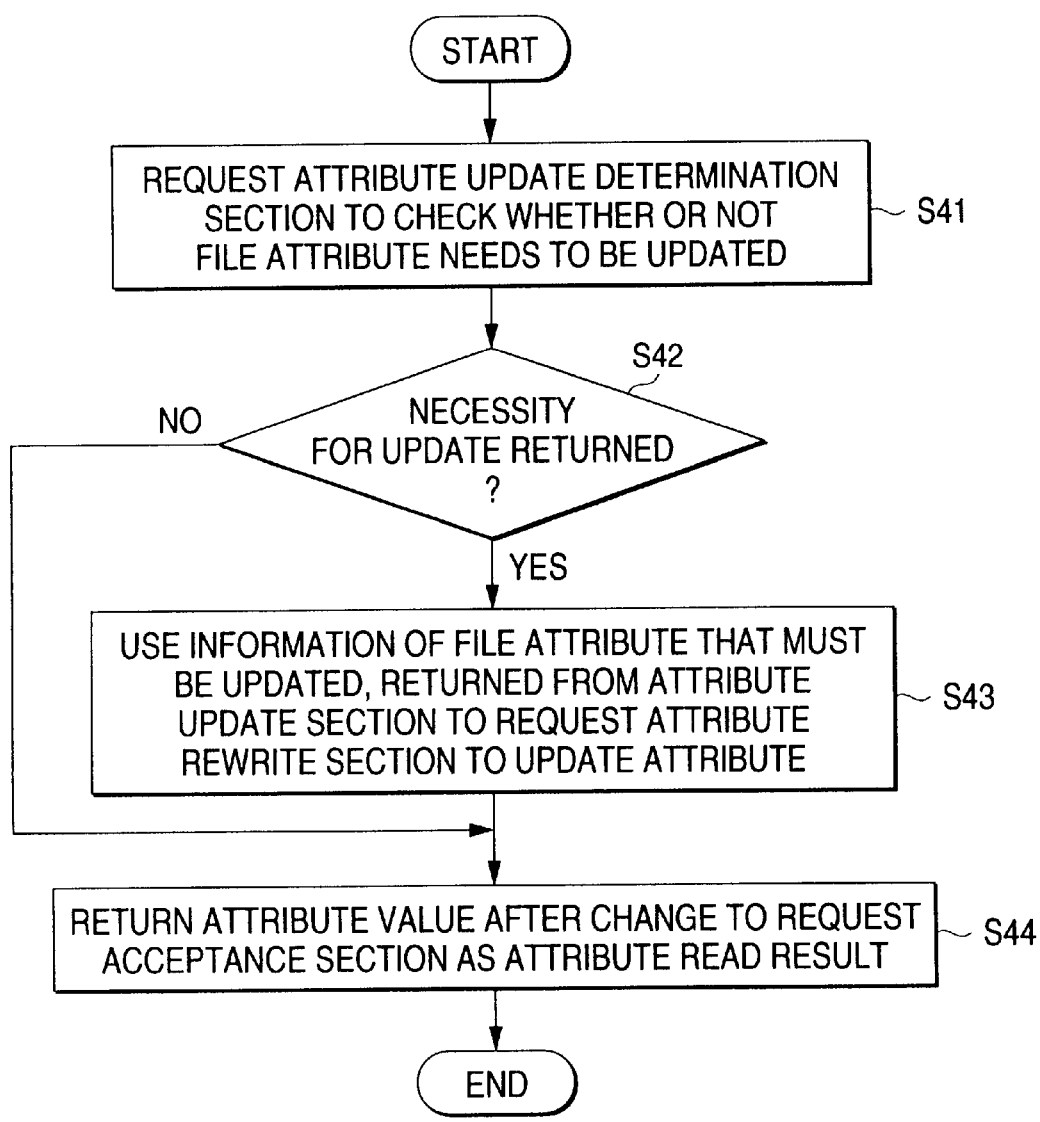
FIG. 10 is a flowchart to show processing of an attribute read section upon reception of a file attribute read request from a request acceptance section.

Assuming that the attribute rewrite section 23c is started when the attribute information 22 is accessed, a processing example of the attribute read section 24 when the attribute information 22 is accessed is shown below:

Processing of the attribute read section upon reception of a file attribute read request from the request acceptance section will be discussed with reference to a flowchart of FIG. 10.

When receiving a file attribute read request from the request acceptance section 21, the attribute read section 24 requests the attribute update determination section 23d of the attribute update section 23 to check whether or not the file attribute needs to be changed at step S41. Next, it determines whether or not the check result returned from the attribute update determination section 23d indicates necessity for attribute change at step S42. If the attribute read section 24 determines that attribute change is required, it uses the attribute type and updated value of the file returned from the attribute update determination section 23d to request the attribute rewrite section 23c to update the attribute at step S43. If a notification indicating that attribute change is not required is returned at step S42 or the attribute change is completed at step S43, the attribute read section 24 returns the value of the attribute information 22 of the file to the request acceptance section 21 as the attribute read result at step S44.

According to the embodiments we have discussed, the following effects are produced:

The file attributes managed together with the file contents in the file server are updated at the update time specified by the user, whereby the server can update the attributes, if it is previously known for the user to change the attribute values of the attributes after a lapse of given time, without explicit attribute change by the user at the time.

Actual attribute update is executed when the attribute information is accessed or at a predetermined constant time or on a constant time basis, whereby the processing efficiency can be improved. Further, attribute update is executed at the specified time, whereby the attribute update time can be set to a time in the middle of the night, etc., at which the system is put under light processing load for updating the attributes to be updated on the day in batch based on the time information; the processing efficiency can be improved.

Further, since the update request list information is sorted in the update time order, the update time is easily determined and the update processing efficiency is high.

In the embodiments we have discussed, update request list information in which updated values are set each time the update time is reached corresponding to file attributes is used as the attribute update condition information, but any information may be used if it is in the format in which update condition time conditions corresponding to file attributes and update content information corresponding thereto can be set. For example, attribute update condition information in which an update condition time condition indicating one period (from a first time to a second time) and its corresponding update content information (for example, the attribute value to be set in the period) is provided and when the update condition is judged at predetermined timing (as in the first or third embodiment) and is satisfied (update is to be executed), update may be executed. In this case, for such a file normally not open to the public and allowed to be read only in April, attribute update condition information is set in a description that can be interpreted by the system with April as update condition time condition and open and not open in other months than April as update content information (attribute value) corresponding to the file attribute, thereby eliminating the need for setting in update time units each time.

In the embodiments we have discussed, entries already updated in the update request list information are deleted in sequence and if attribute update condition information needs to be set, a new entry is added, but any setting means may be used if attribute update condition information can be set.

Further, attributes values are replaced with updated values, but partial addition may be allowed and types may be provided for update values, such as partial addition (add) and replacement (sec).

As described above, in the first aspect of the invention, attribute update condition information containing update time conditions and update content information is previously stored corresponding to file attributes and when the update time condition is satisfied, the corresponding file attribute information is updated based on the update content information, thus update labor of the user can be saved.

According to the second aspect of the invention, attribute update condition information is previously stored as in the first aspect of the invention and when access to file attribute information is detected, whether or not attribute update is required is determined based on the update time condition, and the corresponding file attribute information is updated based on the update content information. Thus, update can be executed when attribute update is required at the latest like the access time, so that the update processing efficiency of the system is improved.

What is claimed is:

1. A file management system for managing attribute information of files stored in a file storage, comprising:

means for storing attribute update condition information in which update time conditions and update content information are set correspondingly to attributes of the files;

means for determining whether or not update is required, based on an update time condition set in the attribute update condition information, when access to the attribute information of a file is detected; and attribute rewrite means for rewriting, based on update content information corresponding to the update time condition, a value of an attribute in the attribute information of the file, if update is required as determined by said means for determining.

2. A file management method for managing attribute information of files stored in a file storage, comprising the steps of:

storing attribute update condition information in which update time conditions and update content information are set correspondingly to attributes of the files;

determining whether or not update is required, based on an update time condition set in the attribute update condition information, when access to the attribute information of a file is detected; and rewriting, based on update content information corresponding to the update time condition, a value of an attribute in the attribute information of the file, when update is required as determined by the step of determining.

* * * * *